United States Patent
August et al.

(10) Patent No.: US 9,128,750 B1
(45) Date of Patent: Sep. 8, 2015

(54) SYSTEM AND METHOD FOR SUPPORTING MULTI-THREADED TRANSACTIONS

(75) Inventors: David I. August, Princeton, NJ (US); Neil Vachharajani, San Francisco, CA (US); Matthew J. Bridges, Scotch Plains, NJ (US)

(73) Assignee: Parakinetics Inc., Princeton, NJ (US)

( * ) Notice: Subject to any disclaimer, the term of this patent is extended or adjusted under 35 U.S.C. 154(b) by 771 days.

(21) Appl. No.: 12/380,677

(22) Filed: Mar. 2, 2009

Related U.S. Application Data

(60) Provisional application No. 61/033,107, filed on Mar. 3, 2008.

(51) Int. Cl.
*G06F 9/46* (2006.01)

(52) U.S. Cl.
CPC ........................................ *G06F 9/467* (2013.01)

(58) Field of Classification Search
CPC ........................................................ G06F 9/467
USPC ............................................................ 712/225
See application file for complete search history.

(56) References Cited

U.S. PATENT DOCUMENTS

| | | | | |
|---|---|---|---|---|
| 5,878,206 A * | 3/1999 | Chen et al. | | 714/19 |
| 6,457,065 B1 * | 9/2002 | Rich et al. | | 719/328 |
| 7,395,418 B1 * | 7/2008 | Caprioli et al. | | 712/228 |
| 7,669,040 B2 * | 2/2010 | Dice | | 712/225 |
| 7,739,456 B1 * | 6/2010 | Cypher et al. | | 711/145 |
| 2002/0161815 A1 * | 10/2002 | Bischof et al. | | 709/101 |
| 2005/0055490 A1 * | 3/2005 | Widell et al. | | 711/1 |
| 2006/0294326 A1 * | 12/2006 | Jacobson et al. | | 711/156 |
| 2007/0143550 A1 * | 6/2007 | Rajwar et al. | | 711/146 |
| 2007/0162520 A1 * | 7/2007 | Petersen et al. | | 707/202 |
| 2007/0186056 A1 * | 8/2007 | Saha et al. | | 711/144 |
| 2007/0198518 A1 * | 8/2007 | Luchangco et al. | | 707/8 |
| 2007/0198781 A1 * | 8/2007 | Dice et al. | | 711/145 |
| 2007/0245128 A1 * | 10/2007 | Gray et al. | | 712/214 |
| 2008/0065864 A1 * | 3/2008 | Akkary et al. | | 712/225 |
| 2008/0120299 A1 * | 5/2008 | Duffy et al. | | 707/8 |
| 2008/0126764 A1 * | 5/2008 | Wu et al. | | 712/226 |
| 2008/0148262 A1 * | 6/2008 | Dice | | 718/101 |
| 2008/0288238 A1 * | 11/2008 | Heller, Jr. | | 703/28 |
| 2008/0288727 A1 * | 11/2008 | Baum et al. | | 711/149 |
| 2009/0006407 A1 * | 1/2009 | Magruder et al. | | 707/8 |
| 2009/0013133 A1 * | 1/2009 | Cypher et al. | | 711/130 |

(Continued)

OTHER PUBLICATIONS

Luis Ceze, James Tuck, Josep Torrellas, Calin Cascaval, Bulk Disambiguation of Speculative Threads in Multiprocessors, Proceedings of the 33rd annual international symposium on Computer Architecture, p. 227-238, Jun. 17-21, 2006.*

(Continued)

*Primary Examiner* — Keith Vicary
(74) *Attorney, Agent, or Firm* — Van Pelt, Yi & James LLP

(57) ABSTRACT

A system that supports multi-threaded transactions includes one or more processors configured to speculatively execute a first thread in a first transaction and speculatively execute a second thread concurrently with the first thread in a comparable transaction with respect to the first transaction. It further includes one or more memories coupled to the one or more processors, configured to provide the one or more processors with data storage. An uncommitted value written by the first thread while executing in the first transaction is visible to the second thread executing in the comparable transaction.

34 Claims, 13 Drawing Sheets

(56) References Cited

U.S. PATENT DOCUMENTS

| | | | |
|---|---|---|---|
| 2009/0031310 A1* | 1/2009 | Lev et al. ................ | 718/101 |
| 2009/0070774 A1* | 3/2009 | Raikin et al. .............. | 718/108 |
| 2009/0083488 A1* | 3/2009 | Madriles Gimeno et al. | 711/118 |
| 2009/0187906 A1* | 7/2009 | Caprioli et al. ............ | 718/101 |
| 2010/0162247 A1* | 6/2010 | Welc et al. ................ | 718/101 |

OTHER PUBLICATIONS

Blundell, Colin, E. Christopher Lewis, and Milo MK Martin. "Subtleties of transactional memory atomicity semantics." Computer Architecture Letters 5.2 (2006); 4 pages.*

N. Vachharajani. Intelligent Speculation for Pipelined Multithreading. PhD thesis, Department of Computer Science, Princeton University, Princeton, New Jersey, United States, Nov. 2008; 171 pages.*

Luchangco et al. (Transaction Synchronizers) in OOPSLA Workshop on Synchronization and Concurrency in Object-Oriented Languages, Oct. 2005; 6 pages.*

Smaragdakis et al. (Transactions with Isolation and Cooperation); OOPSLA'07, Oct. 21-25, 2007; pp. 191-210.*

Molina et al. (SAGAS); Proceedings of the 1987 ACM SIGMOD international conference on Management of data, p. 249-259, May 27-29, 1987, San Francisco, California, USA.*

* cited by examiner

| time | thread 1 | thread 2 (first run) | thread 2 (second run) | thread 2 (third run) |
|---|---|---|---|---|
| 1 | int var = 1; | | | |
| 2 | main { | | | |
| 3 | t2= spawn (thread2); | | | thread2 { |
| 4 | | | | print var; |
| 5 | | | | var =5; |
| 6 | print var; | thread2 { | | } |
| 7 | | print var; | | |
| 8 | var = 3; | var =5; | thread2{ | |
| 9 | } | } | print var; | |
| 10 | | | var = 5; | |
| 11 | | | } | |
| printed result | | 1<br>1 | 1<br>3 | 1<br>5 |

FIG. 1A

| time | thread 1 | thread 2 (thread 2 gets lock first) | thread 2 (thread 2 gets lock second) |
|---|---|---|---|
| 1 | int var = 1; | | thread2{ |
| 2 | main { | | |
| 3 | t2= spawn (thread2); | | |
| 4 | | thread2 { | |
| 5 | | lock { | |
| 6 | | print var; | |
| 7 | | var = 5; | |
| 8 | | }} | |
| 9 | lock { | | |
| 10 | print var; | | |
| 11 | var = 3; | | |
| 12 | }} | | thread2 { |
| 13 | | | lock { |
| 14 | | | print var; |
| 15 | | | var = 5; |
| 16 | | | }} |
| Result | | 1<br>5 | 1<br>3 |

FIG. 1B

| time | thread 1 | thread 2 |
|---|---|---|
| 1 | int varA = 1; | |
|  | int varB = 10; | |
| 2 | main { | |
| 3 |    t2= spawn (thread2); | |
| 4 | | thread2() { |
| 5 | atomic(VIDX) { |   atomic(VIDY) { |
| 6 |    print varA; |     print varB; |
| 7 |    varA = 3; |     varB = 15; |
|  | }} |     print varA; |
|  | |     varA=5; |
|  | | }} |
|  | | |
|  | | |
|  | | |

FIG. 2A

```
int varA = 1;
int varB = 10;
main() {
        t2=spawn(thread2());
        int l_parent_group_id = VID.group_id;
        int l_parent_tx_id = VID.tx_id;
        VID.group_id = allocate(l_parent_group_id, l_parent_tx_id);
        VID.tx_id = 1;
        enter(VID);
        print varA;
        varA = 3;
        commit.p1(VID.group_id);
        for (i=1; i <= VID.tx_id; i++)
          commit.p2(VID.group_id, i);
        commit.p3(VID.group_id);
        VID.group_id = l_parent_group_id;
        VID.tx_id = l_parent_tx_id;
        enter(VID);
} thread2() {
        int l_parent_group_id = VID.group_id;
        int l_parent_tx_id = VID.tx_id;
        VID.group_id = allocate (l_parent_group_id, l_parent_tx_id);
        VID.tx_id = 1;
        enter(VID);
        print varB;
        varB=15;
        print varA;
        varA=5;
        commit.p1(VID.group_id);
        for (i=1; i <= VID.tx_id; i++)
          commit.p2(VID.group_id, i);
        commit.p3(VID.group_id);
        VID.group_id = l_parent_group_id;
        VID.tx_id = l_parent_tx_id;
        enter(VID);
}
```

FIG. 2B

| Tag | VID | $P_1$ | $D_1$ | $P_2$ | $D_2$ | $P_3$ | $D_3$ | $P_4$ | $D_4$ | |
|---|---|---|---|---|---|---|---|---|---|---|
| 0x8001 | (3, 7) | 1 | 0xAB | 0 | - | 1 | 0xBE | 0 | - | ← 908 |
| 0x8001 | (3, 8) | 1 | 0xDE | 0 | - | 0 | - | 0 | - | ← 906 |
| 0x8001 | (3, 6) | 0 | - | 1 | 0xAD | 0 | - | 1 | 0xEF | ← 904 |
| 0x8001 | (3, 9) | 1 | 0xDE | 1 | 0xAD | 1 | 0xBE | 1 | 0xEF | ← 902 |

Request Tag: 0x8001
Request VID: (3, 9)
Merged Result: 0xDEADBEEF

FIG. 9

|  | $VID_{request} < VID_{block}$ 1002 | $VID_{request} = VID_{block}$ 1004 | $VID_{request} > VID_{block}$ 1006 |
| --- | --- | --- | --- |
| Read | *No response* | If block is modified, write back and clear M. Clear X. | |
| Read Excl. | Set $P_k = W_k$ for all bytes in the block. | If block is modified, write back and clear M. Clear V. | If block is modified, write back and clear M. Clear X and set S. |

FIG. 10

SYSTEM AND METHOD FOR SUPPORTING MULTI-THREADED TRANSACTIONS

CROSS REFERENCE TO OTHER APPLICATIONS

This application claims priority to U.S. Provisional Patent Application No. 61/033,107 entitled SPECULATIVE DECOUPLED SOFTWARE PIPELINING filed Mar. 3, 2008 which is incorporated herein by reference for all purposes.

BACKGROUND OF THE INVENTION

In recent years, microprocessor manufacturers have shifted their focus from single-core to multi-core processors. A similar move is made by system integrators, who have been producing more multi-processor systems. To guarantee correct execution on these machines, many traditional programming techniques employ synchronization schemes such as locks and barriers to achieve atomicity. These techniques, however, usually restrict atomic regions to a single thread. In other words, a program that employs these traditional techniques for securing atomic regions effectively executes in a single thread rather than multiple threads in those regions, and is thus unable to take full advantage of the processing power of a multi-core processor or a multi-processor system. Further, since the programmer is typically required to explicitly manipulate synchronization primitives such as locks and barriers, multi-threaded application programming tends to be an undertaking that is burdensome and error-prone.

BRIEF DESCRIPTION OF THE DRAWINGS

Various embodiments of the invention are disclosed in the following detailed description and the accompanying drawings.

FIGS. 1A and 1B illustrate two simple code examples with no multi-threaded transaction support, and their corresponding run results.

FIG. 2A illustrates another code example with multi-threaded transaction support. In this case, each thread marks a section of code, i.e., a transaction, to be executed atomically.

FIG. 2B shows the code sample of FIG. 2A written in its expanded form.

FIG. 9 is a cache block diagram showing an example of multiple matching cache blocks merged to satisfy a request.

FIG. 10 is a table describing the action taken in response to a snooped request according to some embodiments of a multi-threaded transaction system.

DETAILED DESCRIPTION

Figure 3A:
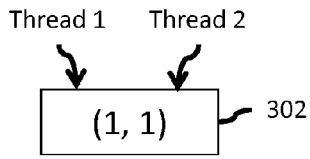
FIGS. 3A-3E are diagrams demonstrating examples in which threads execute in comparable transactions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing multi-threaded transaction support is described. As used herein, a transaction (also referred to as atomic transaction) includes an atomic sequence of memory access operations, such as loads and stores. In some embodiments, the operations in a transaction are executed speculatively. In a speculative transaction, if all the operations are associated with the transaction are successfully executed, the transaction succeeds and all memory states associated with the transaction are committed, meaning that these states are merged with architectural state memory that is visible to the rest of the program. If, however, any memory access conflict is detected (for example, if code executing in another transaction causes a conflicting memory access with any address associated with this transaction), the entire transaction fails and none of the operation is carried out. Further, the memory states associated with the transaction are rolled back such that it appears to the rest of the program as if the transaction had never occurred. A failed transaction may be re-executed repeatedly until it succeeds. Memory accesses in a successfully executed transaction appear to occur without any interference from other threads outside of the transaction. Threads in a program may execute concurrently within multiple transactions. Multiple threads can also execute within a single transaction. Embodiments of multi-threaded transactions implemented using hardware, software, or a combination are discussed in detail below.

In the following discussion, multi-core/multi-processor systems are discussed extensively for purposes of example. In such systems, threads executing transactions concurrently can overlap in time and run simultaneously on separate processors. Threads can also execute transactions concurrently in a single processor system in which the operating system switches between threads and executes instructions in the threads' operations in an intermixed manner.

FIGS. 1A and 1B illustrate two simple code examples with no multi-threaded transaction support, and their corresponding run results. In FIG. 1A, two threads—thread 1 which corresponds to main( ) and thread 2 which corresponds to thread2( ) are shown in separate columns. A global variable var is initially set to 1. Each thread performs a print operation which loads the value from var, and an assignment operation which stores a value to var. The relative time at which operations in the threads are executed is shown in the left most column. As indicated by the results from three different runs, the unsynchronized concurrent access to var produces unpredictable results. In FIG. 1B, the threads are synchronized by using a lock. Depending on which thread is configured to get the lock first, the results are more predictable in this example. The lock, however, has the effect of serializing the thread operations. In other words, one thread has to finish running its locked portion before another thread can start running the latter's locked portion. When these threads run in a multi-core processor or a multi-processor system, the lack of parallelization in the code sample means that the available processor resource is not utilized efficiently.

FIG. 2A illustrates another code example with multi-threaded transaction support. In this case, each thread marks a section of code, i.e., a transaction, to be executed atomically. In this example, the transactions are marked by a function atomic. Each transaction is associated with an identifier, referred to as the version identifier (VID). As will be described in greater detail below, the VIDs chosen for transactions indicate a relationship between the transaction in which thread 1 executes and the transaction in which thread 2 executes. The threads run concurrently, executing instructions and overlapping in time, thus increasing parallelism. Within each transaction, a thread runs speculatively; in other words, the thread runs until all memory accesses in a transaction are successfully executed, at which point the memory states associated with the transaction are committed; or until an access violation is detected, at which point the states associated with the transaction rolls back. Thus, atomicity of the transactions within the threads is guaranteed by utilizing conflict detection techniques in hardware, software, or a combination.

In the example shown in FIGS. 2A and 2B, depending on the VID chosen by the programmer, threads may enter into comparable or incomparable transactions, as well as different types of comparable transactions. In this example, a VID includes a pair of values: a group ID (groupID) and a transaction ID (txID). Transactions with the same groupID form a group. Transactions in the same group have the same parent transaction. The txID indicates the order of the transaction within the group. The VID of (0,0) is reserved to represent committed architectural state which is visible to all threads in the program. A set of special operations are used to implement the atomic function. FIG. 2B shows the code sample of FIG. 2A written in its expanded form. Several special functions used for managing the transactions are:

allocate: arguments include a VID (the groupID and txID) of a parent transaction. Returns an unused groupID and sets the parent of the newly created group to the specified parent VID.

enter: argument includes a VID. Enters the transaction with the specified VID. If the groupID has not been previously allocated, the results are undefined.

commit.p1: argument includes a groupID. Commit phase 1. Acquire the commit token from the parent transaction. Future conflicts will roll back the other conflicting transaction.

commit.p2: argument includes a VID. Commit phase 2. All the stores from the current group in the specified transaction will be committed to architectural state or merged into the parent.

commit.p3: argument includes the groupID. Commit phase 3. Return the commit token to the group's parent.

rollback: argument includes a groupID. All the stores from the specified group will be discarded, and the group is deallocated. Threads must issue enter to enter a legitimate group or committed state.

The above instructions are shown for purposes of example. In other embodiment's, different instructions or instructions implemented differently may be used.

As will be described in greater detail below, the threads can be configured to enter into comparable or incomparable transactions. In incomparable transactions, an uncommitted value within the context of one thread executing a corresponding transaction is not visible to the other thread and the other thread's corresponding transaction. Comparable transactions are ordered. In some embodiments, the order is determined based on the transaction's VID. Details of the ordering are described below. This order corresponds to the semantic order of memory operations across threads participating in the transactions. The semantic order is the order in which memory access operations in different transactions appear to have occurred upon successful completion of the transactions. Semantic order is different from the actual order of execution. During actual operation, transactions can occur in any order and a conflict detection mechanism detects conflicts and rolls back transactions if necessary to give the appearance of transactions having been carried out in a predetermined order. An uncommitted value written by a thread in a transaction is visible to other threads in the same or a later transaction. An uncommitted value written by a thread in a later transaction is not visible to another thread executing in an earlier transaction.

Figure 3B:
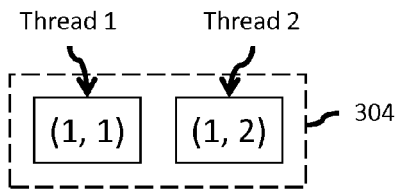

FIGS. 3A-3E are diagrams demonstrating examples in which threads execute in comparable transactions. A solid box such as 302 shown in FIG. 3A represents a transaction. A transaction is identified by its VID, for example (1, 1). A dashed box such as 304 shown in FIG. 3B represents a transaction group. Transactions that are the same, belonging to the same group or have "ancestors" that belong to the same group are comparable. Within one transaction group, transactions are ordered according to their respective txID. Transactions from different groups are ordered according to their ancestors' order.

Figure 3C:
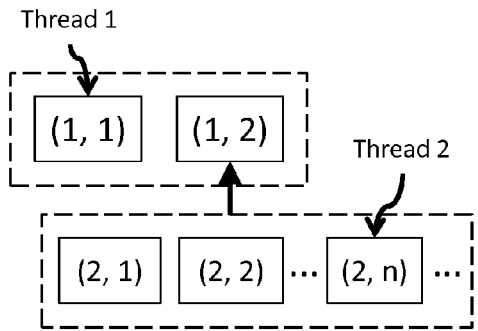
Figure 3D:
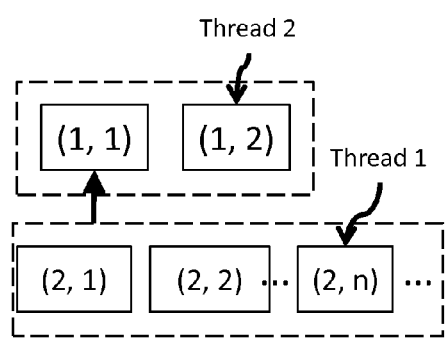
Figure 3E:
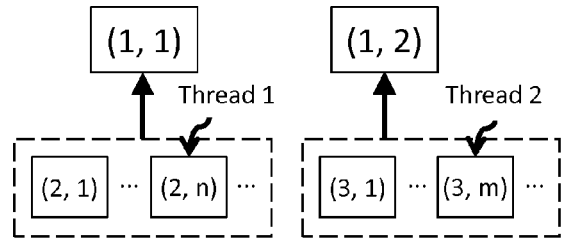

FIG. 3A shows an example in which two threads execute concurrently in the same transaction. This configuration protects threads 1 and 2 from interference by other threads, although the threads 1 and 2 may still interfere with each other during execution. FIG. 3B shows an example in which two threads execute concurrently in separate, comparable transactions in the same group, namely group 1. Thread 1 operates in transaction (1, 1), which is semantically earlier than thread 2's transaction (1, 2). Thus, uncommitted values written by thread 1 in (1,1) are visible to thread 2 but uncommitted values written by thread 2 in (1, 2) are not visible to thread 1. FIG. 3C shows a nested example. Thread 1 executes in transaction (1, 1), and thread 2 executes in transaction (2, n), n being an arbitrary integer that's greater or equal to 1. Since (2, n) belongs to a group whose parent is transaction (1, 2), which is in the same group as transaction (1, 1) but has a later order, transaction (2, n) is considered to be semantically later than (1, 1). In FIG. 3D, thread 1 executes in transaction (2, n), which belongs to a group whose parent (1, 1) is ordered earlier than transaction (1, 2). Thus, transaction (2, n) is semantically earlier than transaction (1, 2). In FIG. 3E, thread 1 executes in transaction (2, n) and thread 2 executes in transaction (3, m), m being an arbitrary integer that's greater or equal to 1. (2, n) and (3, m) have parents (1, 1) and (1, 2), respectively. Thus, (2, n) is ordered earlier than (3, m).

Figure 3F:
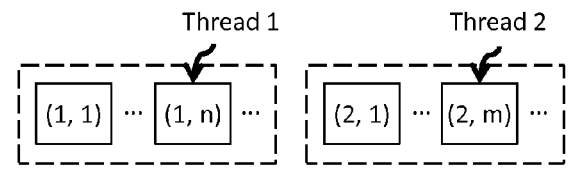
FIGS. 3F and 3G show incomparable transaction examples.
Figure 3G:
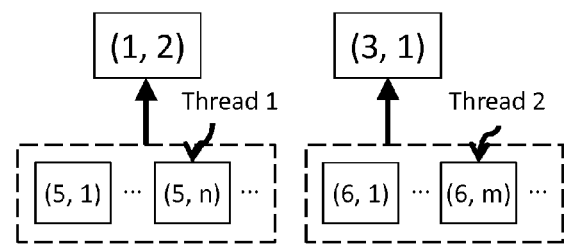

Transactions that belong to different groups that do not have ancestors (excluding (0,0) as an ancestor) belonging to the same group are incomparable. FIGS. 3F and 3G show incomparable transaction examples. In FIG. 3F, thread 1 executes in transaction (1, n) and thread 2 executes in transaction (2, m), which belong to different groups and the groups do not have any ancestor that belongs to the same group. Thus, (1, n) and (2, m) are incomparable. In FIG. 3G, thread 1 executes in transaction (5, n), which has a parent transaction (1, 2). Thread 2 executes in transaction (6, m), which has a parent transaction (3, 1). The parents transactions belong to different groups, therefore (5, n) and (6, m) are not comparable.

By using VIDs and assigning parents to transaction groups, multiple levels of transactions can be nested. As described above, in some embodiments the VID of the parent transaction is specified as the argument to the allocate instruction. A thread can make a transaction a parent to a group of newly allocated child transactions. The thread can spawn more threads, providing them with the newly created child transactions as needed. When a group (or a consecutive subset of a group starting with the semantically oldest uncommitted transaction in the group) of child transactions commits, rather than merging the child transaction's speculative state with the architectural state, the speculative state is merged with its parent's states.

Figure 4:
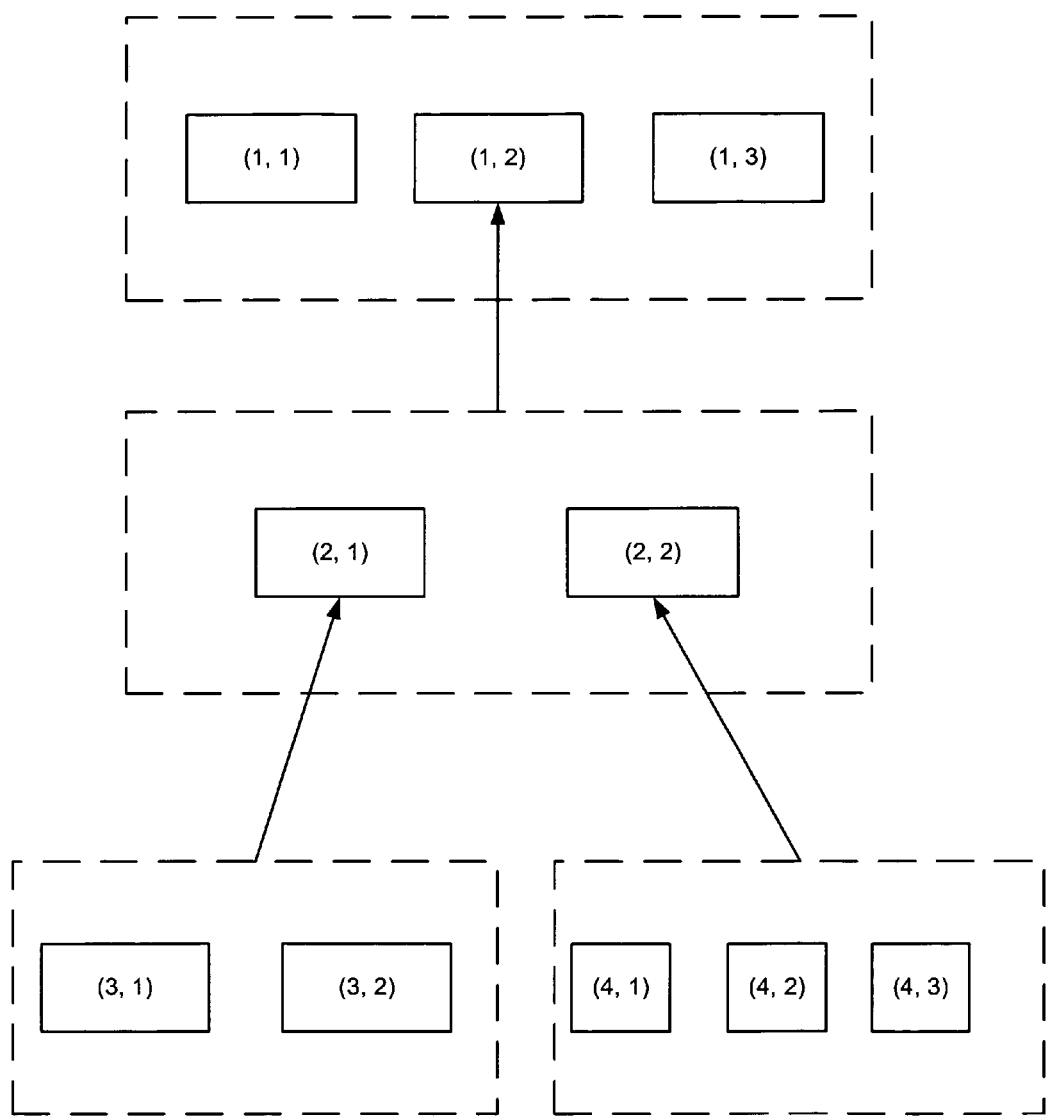
FIG. 4 is a diagram illustrating an example of a multi-threaded transaction hierarchy in which multiple levels of nesting occur.

FIG. 4 is a diagram illustrating an example of a multi-threaded transaction hierarchy in which multiple levels of nesting occur. The transaction hierarchy is tracked to facilitate comparison of VIDs, especially VIDs from different groups. In some embodiments, a special region of memory is allocated to store the VID of the parent of each group. This memory area is organized as an array indexed by group IDs that stores the corresponding parent VID. Values are written into this area by the allocate instruction.

Since the hierarchy is accessed on each cache request, in some embodiments parts of the hierarchy are cached. Each data cache maintains a dedicated multi-threaded transaction hierarchy cache that is indexed by group ID and that stores the first n ancestors of the given group (where n determines the hierarchy cache's line size). Each line also contains an additional bit to indicate whether the line contains a group's entire ancestry or just the first n ancestors.

For each cache access, the hierarchy cache is accessed once for the request version and once for each VID from tag-matching cache blocks. Two VIDs from different groups can be compared using the results from the hierarchy cache. The first common ancestor between the versions is found, and their txIDs are then compared. The results of the comparisons are fed to version combining logic (VCL) to filter out cache lines that should not be read.

Accesses to the hierarchy cache can happen concurrently to the tag and data accesses in the data caches. The initial access to the hierarchy cache uses the request VID and can occur concurrently with the data cache tag access. Matching VIDs read from the tag array can then be fed sequentially into the hierarchy cache concurrently with the data cache data array access. Consequently, the hierarchy cache only appears on the critical path if many cache blocks match the requested address necessitating many serial lookups into the hierarchy cache.

Finally, misses to the hierarchy cache require that the in-memory hierarchical tree be accessed. In some embodiments, dedicated hardware is used to walk the memory data structure; in some embodiments, the responsibility can be passed onto a software handler. In some embodiments, many cold misses are avoided by inserting entries into the cache after an allocate instruction executes using information about the parent which may already be stored in the cache.

Figure 5:
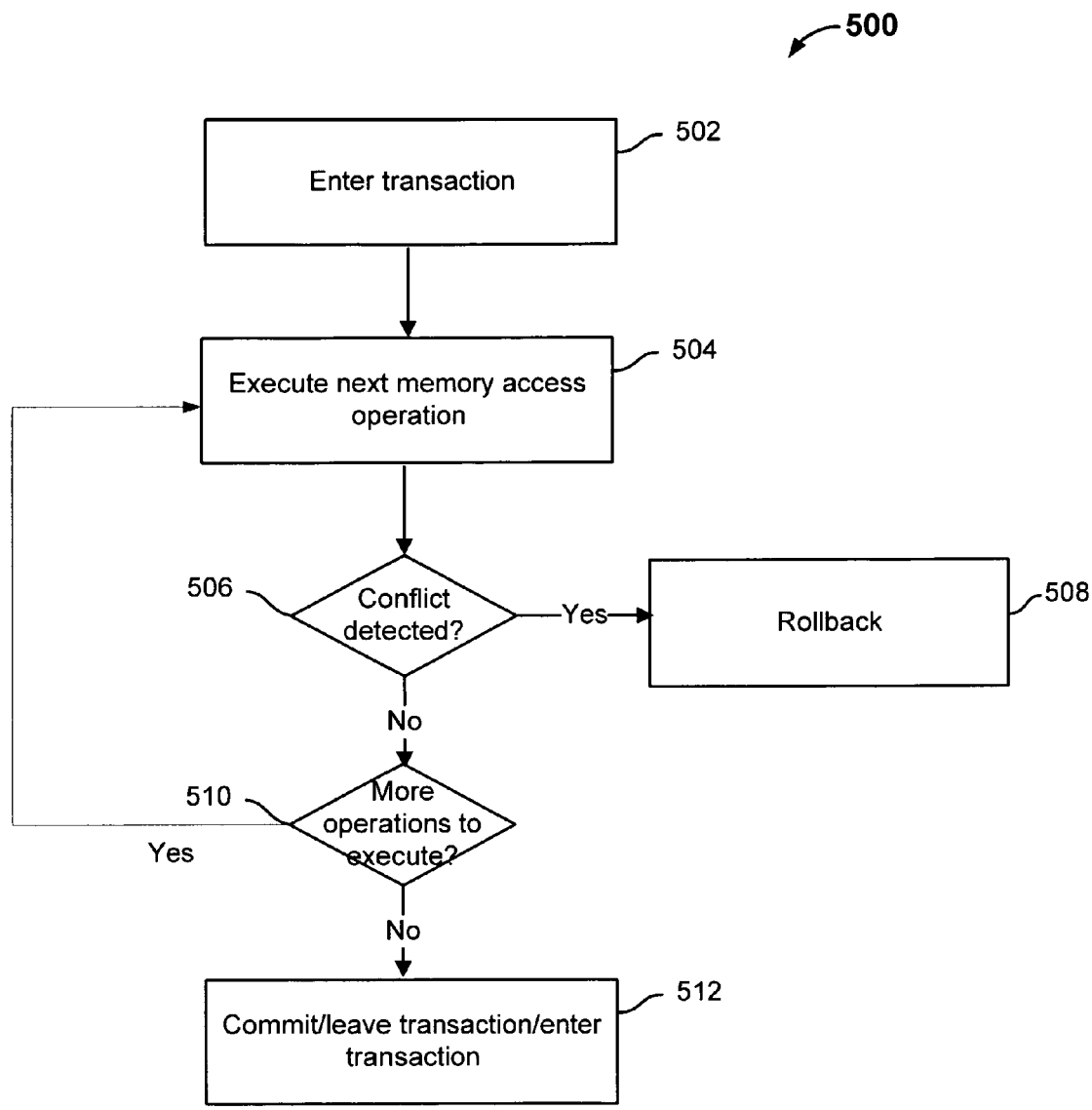
FIG. 5 is a flowchart illustrating an embodiment of a process flow of a transaction speculatively executed by a thread.

FIG. 5 is a flowchart illustrating an embodiment of a process flow of a transaction speculatively executed by a thread. Transaction operation 500 may be implemented on a computer system such as a multi-core or multi-processor system, as well as on a single processor system. At 502, the transaction is entered. At 504, the next memory access instruction in the transaction is executed. At 506, it is determined whether executing the instruction causes any conflict. An intra-group conflict occurs if a transaction writes to a location after a semantically later transaction has read from the location without first writing to it. An inter-group conflict occurs if one transaction writes to a location that another incomparable transaction reads without first writing. If a conflict is detected, at 508, the transaction is rolled back. When a conflict is detected and a transaction is rolled back, all semantically later comparable transactions also need to be rolled back. In some embodiments, a software handler is used to optionally re-execute or abandon the transaction. If no conflict is detected, it is determined whether there are more instructions to be executed at 510. If so, the process returns to 504 and the next instruction is executed. Else, the thread can leave the transaction, enter into another transaction, or commit the transaction at 512. A thread does not necessarily have to commit upon completion of a transaction. This is because multiple transactions, for example consecutive transactions within a group, can be committed together so that only one thread needs to carry out the commit operation. In some embodiments, conflict detection, roll back, and commit operations require the assistance of hardware or lower level software, details of which are discussed more fully below.

Figure 6:
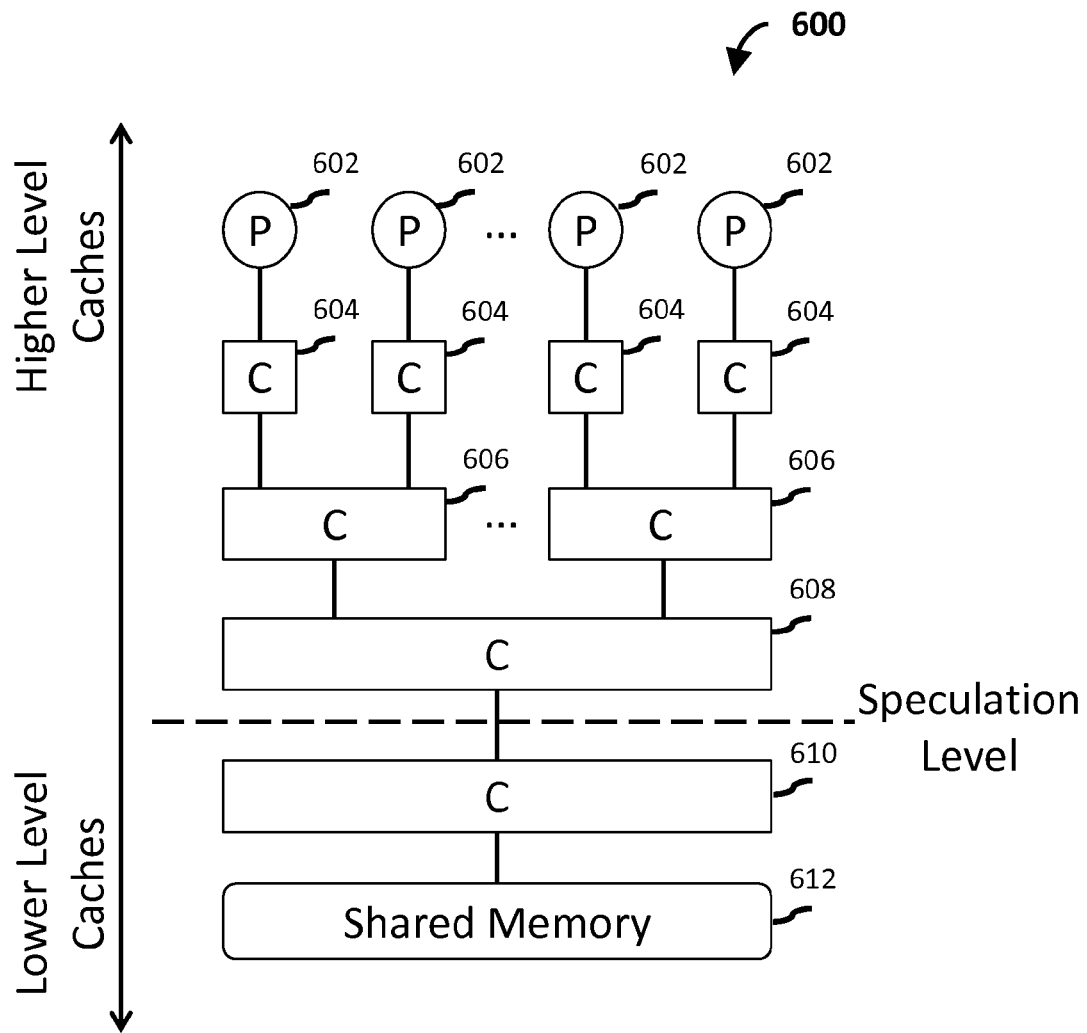
FIG. 6 is a block diagram illustrating an embodiment of a system for supporting multi-threaded transactions.

FIG. 6 is a block diagram illustrating an embodiment of a system for supporting multi-threaded transactions. Transaction operations such as 500 may be performed on system 600. In the example shown, system 600 includes a plurality of processors 602. The memory subsystem of system 600 includes a number of caches. In this example, L1 caches 604, L2 caches 606, and L3 cache 608 are referred to as speculative caches since they store speculative states. Both private and shared caches can store speculative states. L4 cache 610 and shared non-cache memory 612 are non-speculative and only store committed states. Different numbers of cache levels, speculative and non-speculative levels are allowed in other embodiments. A boundary between the speculative caches and the non-speculative caches is referred to as the speculation level and a cache immediately above the speculation level is referred to as the speculative boundary cache (e.g. cache 608). In some embodiments, the system does not include any non-speculative cache.

Figure 7:
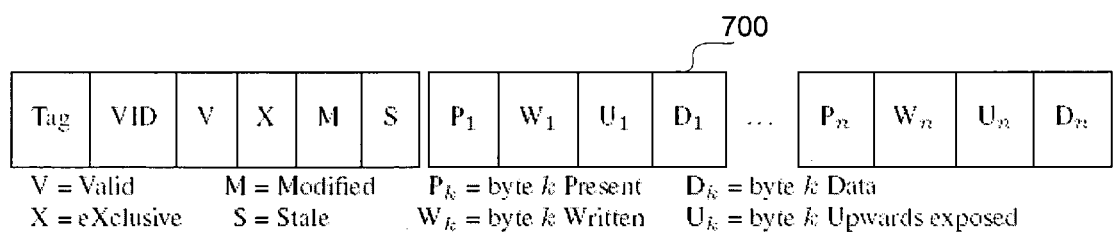
FIG. 7 is a block diagram illustrating an embodiment of a speculative cache block used to implement multi-threaded transactions.

To support multi-threaded transactions, blocks in speculative caches are augmented with additional metadata. FIG. 7 is a block diagram illustrating an embodiment of a speculative cache block used to implement multi-threaded transactions. A speculative cache such as 604-608 may include multiple cache blocks such as 700. Like traditional coherent caches, cache block 700 stores a tag, status bits V indicating whether the cache block is valid, X indicating whether it is exclusive, M indicating whether it is modified, and actual data D. The cache block additionally stores the VID of the transaction to which the block belongs and a stale bit S indicating whether later groups or transactions have modified this block. Each block stores three bits per byte, $P_k$, $W_k$, and $U_k$, respectively, indicating whether the particular data byte is present in the cache (a sub-block valid bit), whether the particular byte has been written in this subTX, and whether the particular byte is upwards exposed. The figure illustrates this metadata being maintained at the byte-level to avoid conflicts due to false sharing, however alternative embodiments could store this metadata at a coarser granularity. A cache access operation used to address cache blocks such as 700 includes an address and a VID. The metadata in the cache blocks is used to determine whether the access is legal. Other cache block configurations are possible. For example, rather than using a stale (S) bit, the VID of the next comparable transaction could be stored to increase the number of accesses that hit in the cache.

Figure 8:
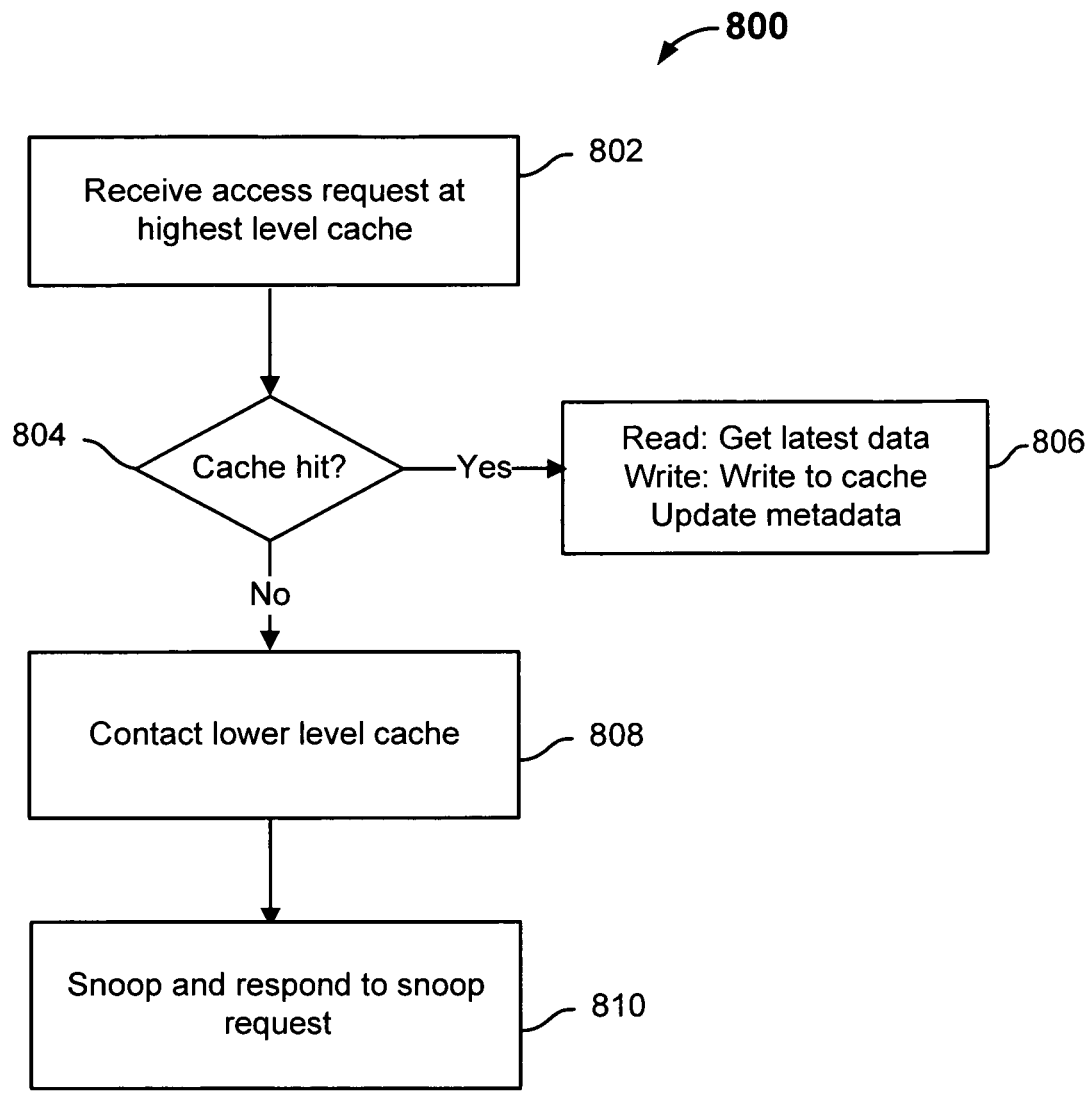
FIG. 8 is a flowchart illustrating an embodiment of a process flow associated with a memory access operation.

Returning to FIG. 5, 504 of process flow 500, executing the next memory access operation, can be implemented on a system such as 600 that employs cache blocks such as 700. FIG. 8 is a flowchart illustrating an embodiment of a process flow associated with a memory access operation. Process flow 800 may be used to implement memory access operation execution. At 802, a memory access request is received by a cache. At 804, it is determined whether there is a cache hit. For a write request (or a read exclusive access), there is a cache hit if the following set of conditions are met:

(1) if the block is valid (V=1) and exclusive (X=1);
(2) the address matches the cache tag;
(3) the request VID=the block VID.

For a read request, there is a cache hit if the following set of conditions are met:

(1) the block is valid (V=1);
(2) the request tag matches the cache tag;
(3) the particular bytes being read are present ($P_k$=1);
(4) the request VID=the block VID, OR the request VID is semantically later than the block VID, and the block is not stale (S=0).

If there is a cache hit, at 806, different processing is carried out depending on whether the request is a read or a write. Following a write request cache hit, the corresponding P bits, the W bits for the written bytes and the M bit for the block are set.

Following a read request cache hit, since the cache can store multiple blocks with the same tag but different VIDs, data from the block with the greatest VID is read. To satisfy the read request, in some embodiments, version combining logic (VCL) is employed to merge data from multiple cache ways. FIG. 9 is a cache block diagram showing an example of multiple matching cache blocks merged to satisfy a request. A read request 902 with a tag of 0x8001 and VID (3,9) is made and a cache hit results in three cache blocks 904, 906, and 908 with matching tags. Note that fields not used in this operation are omitted and only Tag, VID, $P_k$ and $D_k$ are shown. In this example none of the blocks are stale, and a present byte with the latest VID is selected from $D_1$, $D_2$, $D_3$, and $D_4$. Four bytes are merged to form the result 0xDEADBEEF.

Returning to FIG. 8, if there is a cache miss at 804, the cache contacts its lower level cache to satisfy the request at 808. A read miss will issue a read request to the lower level cache, while a write miss will issue a read-exclusive request (or an upgrade request if the block is already present in the requesting cache).

At 810, peer caches to the requesting cache snoop the request (alternatively, a centralized directory can forward the request to sharers of the block) and take appropriate action. If the request VID and block VID are incomparable (i.e., the VIDs trace their ancestry to different unordered groups), no action is necessary. If the request VID and block VID are comparable, appropriate actions are taken depending on the nature of the request and the VIDs of the request and the cache block.

FIG. 10 is a table describing the action taken in response to a snooped request according to some embodiments of a multi-threaded transaction system. Column 1004 where $VID_{request}$=$VID_{block}$ describes the typical actions used by an invalidation protocol. Both read and read exclusive requests force other caches to write back data. Read requests also force other caches to relinquish exclusive access, whereas read exclusive requests force block invalidation.

Columns 1002 and 1006 describe actions unique to a multi-threaded transaction cache. First, consider column 1002 where $VID_{request}$<$VID_{block}$. In this case, the snooping cache does not need to take action in response to a read request since the request thread is operating in a semantically earlier transaction. Thus, data stored in the block should not be observable to the requester. For a read exclusive request, however, action should be taken. The read exclusive request indicates that a semantically earlier transaction may write to the block. Since such writes should be visible to threads operating in the block's transaction, the snooping cache is required to invalidate its block to ensure subsequent reads get the latest written values. Instead of invalidating the entire block, the protocol invalidates only those bytes that have not been written in the block's transaction. This is achieved by copying each $W_k$ bit into its corresponding $P_k$ bit. After such a partial invalidation, reads that access data written in the same transaction still hit in the cache.

Next, consider column 1006 where $VID_{request}$>$VID_{block}$. In this case, the snooping cache may have data needed by the requester since multi-threaded transaction support requires speculative data to be forwarded from early transactions to later transactions. Consequently, the snooping cache takes two actions. First, it writes back any modified data from the cache since it may be the latest data (in transaction order) that has been written to the address. Next, it relinquishes exclusive access to ensure that prior to any subsequent write to the block, other caches have the opportunity to invalidate their corresponding blocks. Similar action is taken in response to a read exclusive request. Data is written back and exclusive access is relinquished. Additionally, the snooping cache marks its block stale (by setting the S bit), ensuring that accesses made from later transactions are not serviced by this block (recall that if $VID_{request}$>$VID_{block}$, a read is only hit if the block is not marked stale).

For correct operation, the requesting cache should also "snoop" in response to its own requests. This is necessary since the cache may contain blocks relevant to the request, but that did not cause the access to hit because the blocks were stale, or the request was a write and the VIDs did not match exactly.

The requesting cache assembles the complete response to its request by using the VCL on all blocks written back and the response from the lower level cache. The assembled cache block is inserted into the requesting cache using the largest VID of all blocks fed into the VCL. Since all bytes will be returned in response to the request, all its P bits should be asserted. Finally; the stale bit is copied from the returned block with the largest VID. Similarly, the M and W bits are set based on the corresponding bits from a returned block where $VID_{request}=VID_{block}$. If no such block is returned, the M and W bits are cleared.

The above implementation assumes that each cache's lower level cache is also speculative. In some embodiments such as system 600, however, there is non-speculative cache or non-speculative memory below the speculative cache at the speculation level. A speculative cache immediately above the speculation level is referred to as a speculative boundary cache. Cache 608 of system 600 is an example of a speculative boundary cache. A speculative boundary cache reacts somewhat differently than other speculative cache since it does not write back speculative data to their lower level cache, and it is responsible for allocating cache blocks for new VIDs.

In some embodiments, two modifications are made to handle the inability to write back speculative data to a lower level cache. First, any eviction of a modified speculative block should cause the corresponding group to be rolled back. Second, write backs of speculative state necessitated by the coherence protocol are handled specially. The speculative boundary cache still responds to the request, forwarding the speculative data it possesses. If $VID_{request}>VID_{block}$, the cache does not clear its modified (M) bit for the block. This means a cache block can potentially be in the modified state, but not exclusive. Such a state indicates that when the transaction commits, the cache must acquire exclusive access for the block before it can merge the data into committed state or another transaction.

Returning to FIG. 5, 506 of transaction operation 500, conflict detection, can be implemented on systems such as 600 employing cache designs such as 700. In some multi-threaded transaction systems, an intra-group conflict occurs if a transaction writes a location after a later transaction in the same group has read the location without first writing it. An inter-group conflict occurs if one transaction writes a location that another, incomparable transaction reads without first writing.

To detect these conflicts, the system should track which locations have been read without first having been written to detect conflicts. Such reads are referred to as upwards-exposed uses. In some embodiments, the system uses the $U_k$ bit stored per byte to track upwards-exposed uses.

The cache system sets $U_k$ to $U_k \lor \overline{W_k}$ each time it reads data from the cache. This ensures any bytes that are satisfied by a block whose VID is less than this block's VID are marked. The coherence protocol is then extended to detect intra-transaction conflicts when invalidating bytes. If a coherence request forces bytes to be invalidated (i.e., on a read exclusive request with $VID_{request}<VID_{block}$), $U_k$ is set, and $P_k$ is to be cleared, then a conflict has occurred. To detect inter-transaction conflicts, the coherence protocol also handles the case when $VID_{request}$ and $VID_{block}$ are incomparable. In particular, for an incomparable read request, if $W_k$ is set for any byte in the block then a conflict has occurred. Similarly for an incomparable read exclusive request, if $U_k$ is set for any byte in the block then a conflict has occurred. In all conflicting cases, the requesting transaction, the snooping transaction, or both may be rolled back.

Additionally, read requests also modify cache blocks by potentially setting U bits. Since the access should not modify blocks from previous transactions, such "hits" should cause the cache line to be duplicated for the request version (i.e., the block VID should be set to the request VID). Since such duplication can occur at arbitrary caches in the hierarchy, strict inclusion will no longer be satisfied. A higher level cache can contain a block with a specific VID that its lower level cache does not contain. Consequently all coherence actions affect all caches in a particular sub-tree of the hierarchy.

Returning to FIG. 5, a part of 512 of transaction operation 500, commit, is implemented in some embodiments on a system such as 600 employing a cache design such as 700. Referring to FIG. 2B, in some embodiments the commit operation occurs in three phases. The first and the last phases, commit.p1 and commit.p3 acquire and release a lock based on the VID of the parent transaction. This is implemented using conventional memory locks in some embodiments. To handle phase 2 commit.p2, for each modified block contained in the cache whose version equals the committing version, the cache acquires exclusive access to the corresponding line in the parent version. The committing block is merged into the parent block and the committing block can be discarded. Commit should proceed from higher level caches to lower level caches. This prevents the commit of a line in a lower level cache from causing the corresponding line in a higher level cache from being displaced.

In some embodiments, commit performance is improved using a structure similar to the ownership-required buffer (ORB) to prevent scanning the entire cache on commit. This buffer records all the cache blocks that are written in a given transaction. On commit, this buffer can be scanned to find all the blocks that need to be committed rather than scanning the entire cache's contents.

Rollback operation 508 in transaction operation 500 is implemented in some embodiments on a system such as 600 employing a cache design such as 700. In one implementation, each cache in the system discards any cache block whose VID is greater than or equal to the VID of the rollback request. To ensure child groups also get rolled back, the transaction hierarchy is consulted to generate appropriate rollback messages for all child groups.

Figure 11:
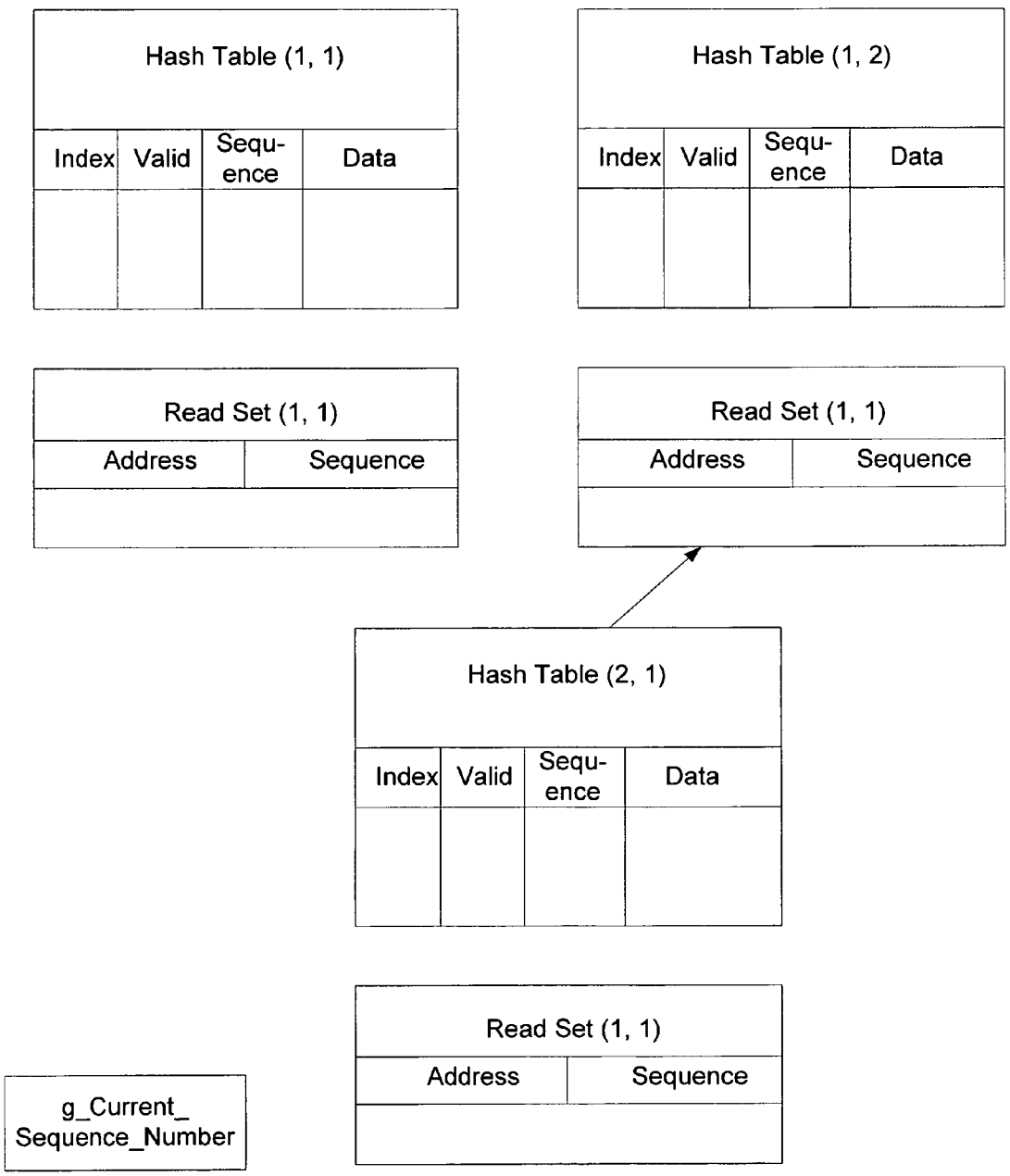
FIG. 11 is a data structure diagram illustrating a data structure used in an embodiment of software based multi-threaded transaction implementation.

The above examples describe multi-threaded transaction systems that are mostly hardware based. In some embodiments, a software implementation is used. FIG. 11 is a data structure diagram illustrating a data structure used in an embodiment of software based multi-threaded transaction implementation. Other data structures can be used. In this example, a transaction hierarchy is maintained. For each transaction, the system maintains a corresponding hash table and a read set. The contents of each transaction are stored in its corresponding hash table. An address is used as an index of the table, which maps to three pieces of information: a valid bit, a sequence number, and the actual data stored at the given address. The read set stores address—sequence number pairs. Globally, the system also maintains a current sequence number.

Figure 12:
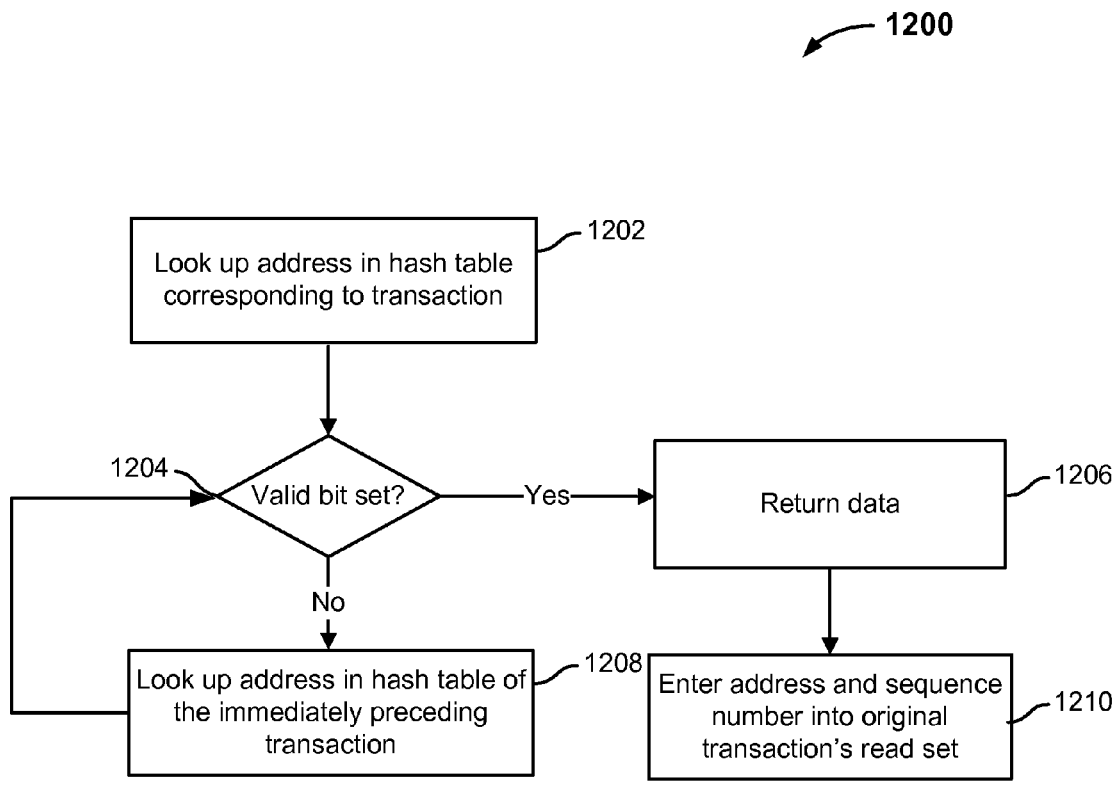
FIG. 12 is a flowchart illustrating an embodiment of a read process utilizing the data structure shown in FIG. 11.

FIG. 12 is a flowchart illustrating an embodiment of a read process utilizing the data structure shown in FIG. 11. Process flow 1200 can be implemented as computer program code that is embodied in a computer readable storage medium. To perform a read in a given transaction, at 1202, the address is looked up in the hash table corresponding to the given transaction. At 1204, it is determined whether the valid bit stored at the given location in the hash table is set. If so, the data is returned at 1206. Otherwise, the address is looked up in the hash table of the immediately preceding transaction at 1208. This process continues until the data is found. When the data is found, the address and the sequence number for the found data are entered in the original transaction's read set at 1210. Referring to FIG. 11 as an example, if a read is to be performed in transaction (2, 1), but no valid data is found in hash table (2, 1), hash table (1, 2) is searched. If still no valid data is found, hash table (1, 1) is also searched. When data is found, the address and sequence number for the data is entered into (2, 1)'s read set.

To perform a write operation in a given transaction, the entry in the hash table for the given transaction at the given address is updated, setting the valid bit to true, the sequence number to the current global sequence number, and the data to data given by the write operation. The global sequence number is then incremented by one.

Upon commit, for each address in the read set, a lookup is performed starting in the parent transaction for that address. If the sequence number returned by the lookup is different than the sequence number stored in the read set, then a conflict has occurred. If none of the items in the read set cause a conflict, then the data from the two transactions is merged and the committing transaction is discarded. A rollback is implemented by discarding the data structures for the transaction that is rolled back.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system that supports multi-threaded transactions, comprising:
   one or more processors configured to:
      speculatively execute a first thread in a first transaction;
      speculatively execute a second thread concurrently with the first thread in a second transaction that is configured to be a comparable transaction with respect to the first transaction, wherein:
         the first transaction is associated with a first version identifier (VID) comprising a first VID first indication and a first VID second indication;
         the second transaction is associated with a second VID comprising a second VID first indication and a second VID second indication;
         the first VID first indication and the second VID first indication indicate that the second transaction is a comparable transaction with respect to the first transaction;
         the first VID second indication and the second VID second indication indicate that the second transaction is configured to occur semantically later than the first transaction; and
         semantic ordering of the first transaction and the second transaction is the order in which memory access operations in the first transaction and the second transaction appear to have occurred upon successful completion of the first transaction and the second transaction; and
   one or more memories coupled to the one or more processors, configured to provide the one or more processors with data storage; wherein
   an uncommitted value written by the first thread while executing in the first transaction is visible, at least before the first transaction completes, to the second thread executing in the comparable transaction.

2. The system of claim 1, wherein the first transaction is executed atomically.

3. The system of claim 1, wherein the comparable transaction is executed atomically.

4. The system of claim 1, wherein the second transaction is the same transaction as the first transaction.

5. The system of claim 1, wherein the one or more processors are further configured to commit the first transaction and the second transaction as a group.

6. The system of claim 5, wherein the first transaction is committed before the second transaction is committed.

7. The system of claim 1, wherein the first transaction and the second transaction belong to a group.

8. The system of claim 1, wherein the first transaction and the second transaction belong to a group that is nested in a parent transaction.

9. The system of claim 1, wherein an uncommitted value written by the second thread while executing in the semantically later second transaction is not visible to the first thread executing in the first transaction.

10. The system of claim 1, wherein the second transaction is nested in the first transaction.

11. The system of claim 10, wherein the one or more processors are further configured to commit the second transaction, including by merging the second transaction with the first transaction.

12. The system of claim 1, wherein the one or more processors are further configured to execute a third thread concurrently in a third transaction that is an incomparable transaction with respect to the first transaction, wherein the uncommitted value written by the first thread while executing in the first transaction is not visible to the third thread executing in the incomparable transaction.

13. The system of claim 12, wherein the third transaction is associated with a third version identifier (VID) comprising a third VID first indication, wherein the first VID first indication and the third VID first indication indicate that the third transaction is an incomparable transaction with respect to the first transaction.

14. The system of claim 1, wherein the first VID first indication includes a first identifier, and the first VID second indication includes a second identifier.

15. The system of claim 14, wherein the first identifier identifies a group with which the first transaction is associated, and the second identifier indicates a semantic order of the first transaction within the group.

16. The system of claim 1, wherein the one or more memories are further configured to detect a conflict.

17. The system of claim 16, wherein in response to detecting the conflict, the one or more memories is further configured to roll back a conflicted transaction.

18. The system of claim 17, wherein the one or more memories is further configured to roll back all later comparable transactions of the conflicted transaction.

19. The system of claim 1, wherein the one or more memories are further configured to detect an inter-group conflict that occurs between incomparable transactions from different groups.

20. The system of claim 1, wherein the one or more memories are further configured to detect an intra-group conflict that occurs between comparable transactions from a same group.

21. The system of claim 1, wherein the one or more memories includes a plurality of caches.

22. The system of claim 21, wherein at least some of the caches are speculative caches configured to store speculative states to support speculative execution of the first thread and speculative execution of the second thread.

23. The system of claim 21, wherein at least some of the caches are non-speculative caches.

24. The system of claim 21, wherein at least some of the caches include transactional support metadata in a cache block.

25. The system of claim 24, wherein executing a memory access operation by the first or the second thread includes verifying the transactional support metadata according to a set of rules associated with the memory access operation.

26. The system of claim 1, wherein the one or more memories are configured to maintain a set of one or more hash tables and a set of read information comprising an address and a sequence number.

27. The system of claim 26, wherein the set of one or more hash tables and the set of read information are used to facilitate atomic execution of the first transaction and the comparable transaction.

28. The system of claim 1, wherein the first transaction and the second transaction are executed concurrently on separate processors.

29. The system of claim 1, wherein the one or more memories are further configured to:
  detect whether there is a conflict caused by the first transaction writing to a location after a semantically later transaction has read from the location without first writing to the location; and
  roll back the first transaction in response to detecting the conflict.

30. The system of claim 1, wherein the one or more memories are further configured to:
  detect whether there is a conflict caused by the first transaction writing to a location that an incomparable transaction reads without first writing; and
  roll back the first transaction in response to detecting the conflict.

31. The system of claim 1, wherein the one or more processors are further configured to, upon successful completion of the first transaction, commit the uncommitted value by merging a memory state associated with the uncommitted value with an architectural state or with states of a parent of the first transaction.

32. A method for providing multi-threaded transaction support in a computer system, comprising:
  speculatively executing a first thread in a first transaction;
  speculatively executing a second thread concurrently with the first thread in a second transaction that is configured to be a comparable transaction with respect to the first transaction; wherein:
  the first transaction is associated with a first version identifier (VID) comprising a first VID first indication and a first VID second indication;
  the second transaction is associated with a second VID comprising a second VID first indication and a second VID second indication;
  the first VID first indication and the second VID first indication indicate that the second transaction is a comparable transaction with respect to the first transaction;
  the first VID second indication and the second VID second indication indicate that the second transaction is configured to occur semantically later than the first transaction; and
  semantic ordering of the first transaction and the second transaction is the order in which memory access operations in the first transaction and the second transaction appear to have occurred upon successful completion of the first transaction and the second transaction; wherein
  an uncommitted value written by the first thread while executing in the first transaction is visible, at least before the first transaction completes, to the second thread executing in the comparable transaction.

33. A computer program product for providing multi-threaded transaction support in a computer system, the computer program product being embodied in a non-transitory computer readable storage medium and comprising computer instructions for:
  speculatively executing a first thread in a first transaction; and
  speculatively executing a second thread concurrently with the first thread in a second transaction that is configured to be a comparable transaction with respect to the first transaction; wherein:
  the first transaction is associated with a first version identifier (VID) comprising a first VID first indication and a first VID second indication;
  the second transaction is associated with a second VID comprising a second VID first indication and a second VID second indication;
  the first VID first indication and the second VID first indication indicate that the second transaction is a comparable transaction with respect to the first transaction;
  the first VID second indication and the second VID second indication indicate that the second transaction is configured to occur semantically later than the first transaction; and
  semantic ordering of the first transaction and the second transaction is the order in which memory access operations in the first transaction and the second transaction appear to have occurred upon successful completion of the first transaction and the second transaction; and
  an uncommitted value written by the first thread while executing in the first transaction is visible, at least before the first transaction completes, to the second thread executing in the comparable transaction.

34. A computer program product as recited in claim 33, further comprising computer instructions for detecting a conflict using at least a hash table.

* * * * *